United States Patent [19]
Tranchon

[11] Patent Number: 5,218,769
[45] Date of Patent: Jun. 15, 1993

[54] SENSOR FOR SENSING ANGLE OF ROTATION AND/OR NUMBER OF ROTATIONS EFFECTED, AND A POWER STEERING SYSTEM FOR A VEHICLE INCLUDING SUCH A SENSOR

[75] Inventor: Georges Tranchon, Creteil, France
[73] Assignee: Valeo Electronique, Voisins-Le-Bretonneux, France
[21] Appl. No.: 778,257
[22] Filed: Oct. 17, 1991
[30] Foreign Application Priority Data Oct. 19, 1990 [FR] France ................ 90 12944

[51] Int. Cl.⁵ .................. G01B 7/30; B62D 15/00
[52] U.S. Cl. ................. 33/1 PT; 33/1 N; 180/140
[58] Field of Search ............. 33/1 PT, 1 N; 180/140-142, 149, 79.1; 364/424.05, 559

[56] References Cited

U.S. PATENT DOCUMENTS 4,031,386 6/1977 Recker .
4,449,191 5/1984 Mehnert ..................... 33/1 PT
4,495,700 1/1985 Ernst ........................ 33/1 PT
4,625,411 12/1986 Kashiwagi et al. ............ 3/1 PT
5,018,594 5/1991 Takahashi et al. ............ 180/140
5,032,996 7/1991 Shfraishi .................... 180/140
5,065,324 11/1991 Oshita et al. ................ 33/1 PT

FOREIGN PATENT DOCUMENTS 0126843 2/1984 European Pat. Off. .
184286 6/1986 European Pat. Off. ........ 33/1 N
1400300 7/1964 France .
2001767 7/1978 United Kingdom .

Primary Examiner—William A. Cuchlinski, Jr.
Assistant Examiner—C. W. Fulton
Attorney, Agent, or Firm—Morgan & Finnegan

[57] ABSTRACT

A sensor for measuring an angle of rotation, and in particular the instantaneous angle of rotation of a rotatable member such as a steering column of a motor vehicle, is especially applicable in a power steering mechanism for a motor vehicle and includes a first wheel, the movement of which serves for measuring the angle of rotation and its direction. The sensor further includes a second wheel which is mechanically linked with but movable relative to the first wheel, the displacement of the second wheel being an indication of the number of rotations effected about an axis by the first wheel, and/or an indication of the direction of the rotation.

13 Claims, 6 Drawing Sheets 5,218,769

SENSOR FOR SENSING ANGLE OF ROTATION AND/OR NUMBER OF ROTATIONS EFFECTED, AND A POWER STEERING SYSTEM FOR A VEHICLE INCLUDING SUCH A SENSOR

FIELD OF THE INVENTION

This invention relates to a sensor for sensing an angle of rotation, and for giving a signal representing the direction of rotation and/or the number of rotations effected by a rotatable member with which the sensor is coupled. The invention also relates to a power steering mechanism for a vehicle including such a sensor.

The present invention is especially applicable in the context of vehicle power steering mechanisms, in particular for motor vehicles, of the kind in which control by an electronic system enables the force exerted on a steering member such as the steering column to be assisted as necessary. This control operation is a function of the steering angle called for by the driver; in the case of vehicles having four wheel steering, in which the rear wheels require a different steering angle from the front wheels, the control operation is able to distinguish between these two requirements of the front and rear wheels.

BACKGROUND OF THE INVENTION

It has already been proposed in the prior art to provide a number of different arrangements for indicating the direction of rotation, that is to say the sign of the angle of rotation measured, and also, where necessary, to count the number of rotations effected by the steering column. In particular, such arrangements include at least one disc, the rotation of which follows variation in the angle which is required to be measured. The periphery of this disc cooperates with a suitable measuring means for measuring the angle of rotation. In the prior art, a sensor of this kind is commonly called an incremental angular coder. In such a device, the disc includes recesses or tracks, which serve as indicia that pass in front of a given type of reading device. The reading device produces a pulse on a measuring signal which can be processed electronically in such a way as to give the absolute angle of steer, the rate at which the angle of steer is varying, the direction of rotation, and (if required) the number of rotations effected.

Up to the present time in the prior art, such arrangements call for expensive means for counting the number of turns by memorising the pulse count, providing supplementary indicia tracks and so on.

DISCUSSION OF THE INVENTION

An object of the present invention is to provide a means which enables an angular coder or sensor for sensing the angle of rotation to provide a signal representing the completion of at least one full turn in the rotation of the coder, and therefore of the rotatable member such as the steering column, but in a manner which is both reliable and economic.

According to the invention, a sensor for sensing an angle of rotation, in particular of the optronic type, is characterised in that it includes a first wheel, the movement of which serves for measuring the angle of rotation and for indicating the direction and origin of the movement, in that it also includes a second wheel which is at least partially coupled with the movement of the first wheel, and in that at least one detector detects the displacement of the said second wheel which serves to indicate the number of rotations carried out by the first wheel and/or to indicate the direction of rotation. The first wheel carries at least one track carrying indicia representing position information, such that reading of this track by a detector serves to measure the angle and the direction of rotation and to indicate a point of reference (i.e. the zero or origin of the rotational movement of the rotating member such as a steering column).

The invention also provides a power steering mechanism for a vehicle, that includes a sensor in accordance with the invention in which the first wheel of the latter is mechanically coupled to a rotatable member such as a steering column.

Further advantages and features of the present invention will appear more clearly from the description which follows, of a preferred embodiment of the invention, which is given by way of example only and with reference to the accompanying drawings.

DESCRIPTION OF A PREFERRED EMBODIMENT OF THE INVENTION

Figure 1A:
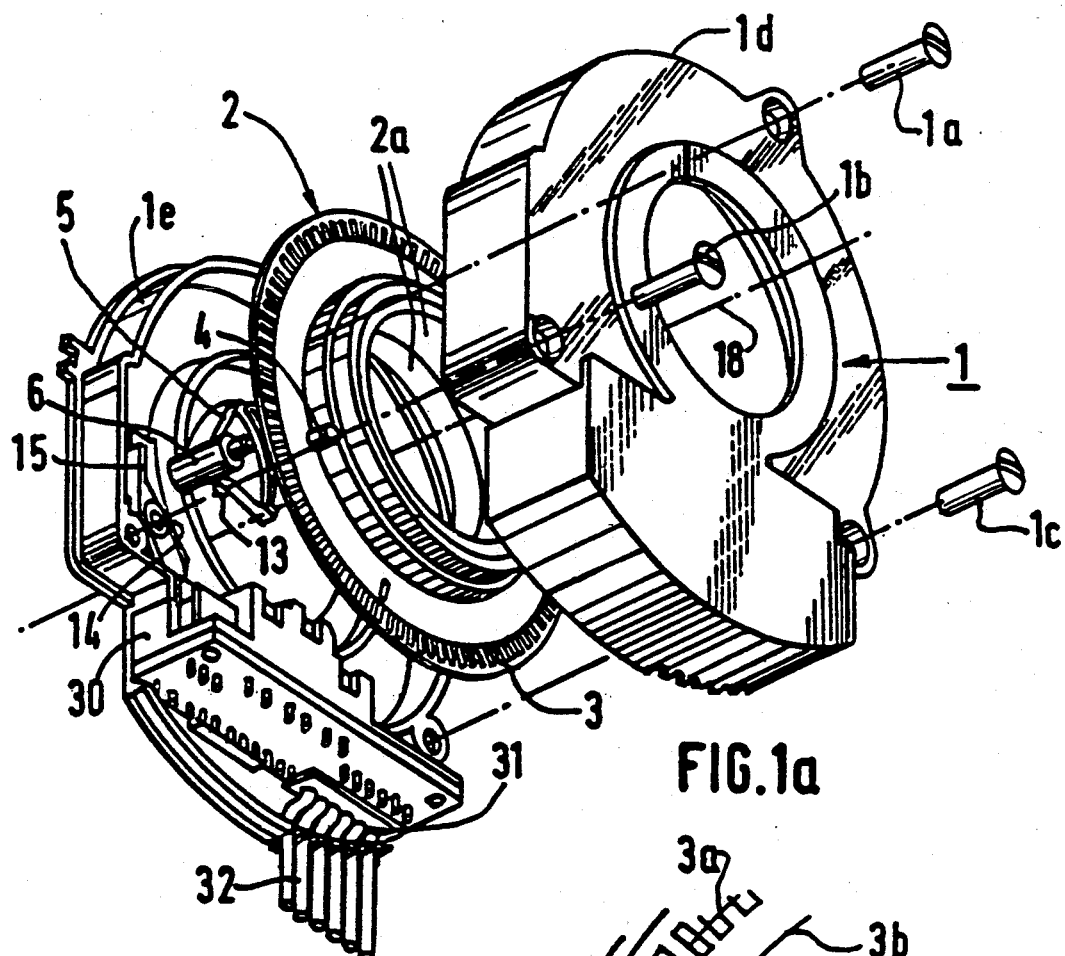
FIG. 1a is an exploded isometric view of a sensor for sensing angle of rotation, in one form according to the invention.

With reference to FIG. 1a, this shows an incremental coder, or sensor for sensing angles of rotation, in accordance with the invention. The sensor is indicated generally at 1. It consists mainly of a disc or wheel 2 which is coupled to a rotatable shaft (not shown), the axis of which is indicated at 18. It is the rotational movement of this shaft that is to be sensed and measured by the sensor 1. For simplicity in this description, it will be referred to, where necessary, as "the shaft 18". The shaft 18 is coupled to the disc 2 by means of two toroidal rings 2a.

The sensor 1 has a housing comprising a cover plate 1d, which is secured to a base member 1e by means of three screws indicated at 1a, 1b, 1c. The disc 2 has a specific number of peripheral slots or marks 3, in the manner already well known in the technology of optical angular coders. The slots 3 are arranged as a set along at least one circular track, which is read by a detector connected to a fixed reference point of the sensor. This detector converts the information detected on the set of slots 3 into electrical signals, which may be processed by a suitable electronic processor.

This electronic processor is of a kind which is arranged to perform one or more of the following functions:

(i) measurement of the angular position of the wheel 2 coupled to the rotatable shaft 18, with respect to a reference position;
(ii) measurement of the rotational velocity of the wheel 2 coupled to the rotatable shaft 18, at least between two values of the above mentioned angular position; and
(iii) determination of the direction of rotation of the wheel 2 coupled to the rotatable shaft 18.

The combination of an optical sensor with an electronic signal processor as described above constitutes an optical-electronic or "optronic" sensor. Such an electronic processor is expensive, and the sensor here described and shown in the drawings is such that some of the above mentioned functions are carried out within the optical sensor itself. In particular, in some applications, for example the monitoring of the steering direction of the steerable road wheels of the vehicle, it is necessary to obtain certain simple data, such as the number of rotations effected by the steering column or the direction of its rotation, so that it can be established whether or not it is appropriate to halt the change in steering direction of the wheels, or whether or not the steering is in a neutral position. Such data could be processed electronically, but, as mentioned above, the equipment for doing this is costly.

The invention therefore aims to provide an effective but cheaper way of processing this data, especially with a view to enabling sensors for sensing angular position to be mass produced for application to the power steering of motor vehicles; and it is in that context that this description should be read, though without limitation. In addition, it should be noted that the present invention is not limited to the case where an optical coder is used. Other measurement techniques may be employed, in particular those using magnetic rather than optical systems.

Figure 1B:
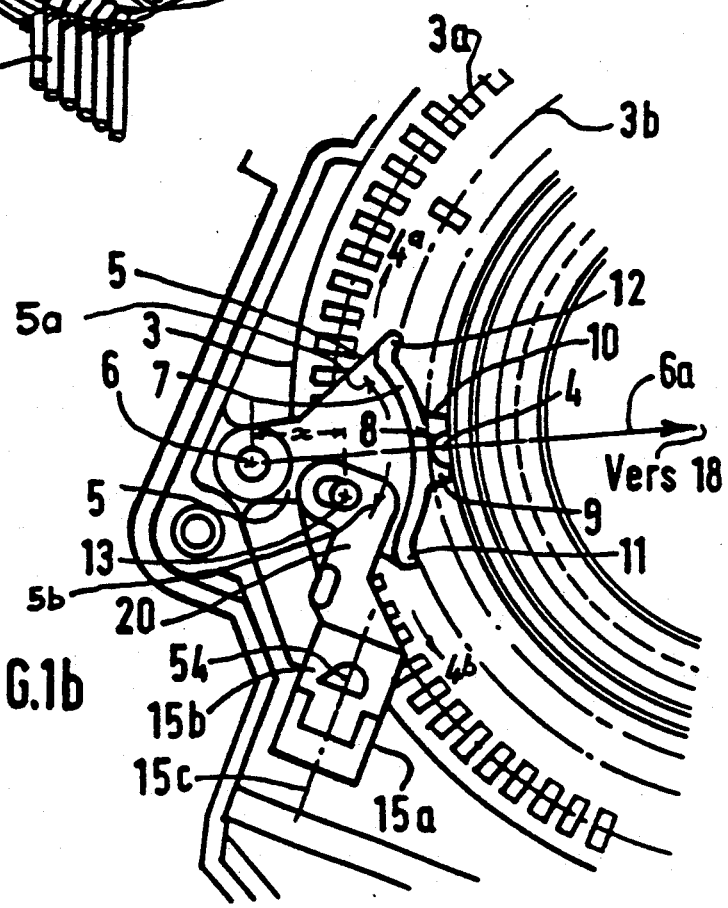
FIG. 1b is a scrap elevation, on a larger scale, showing part of the sensor.

The disc 2, or first wheel, carries a pin 4 which is arranged at a predetermined distance from the centre of rotation of the wheel 2. The pin 4 is thus fixed at a rotating point on the first wheel 2. The pin 4 extends through the thickness of the wheel 2, and it has an extension (not visible in FIG. 1a) which is arranged to come into engagement in a recess 8 which is carried by a second wheel 5. The second wheel 5 is mounted on a spindle 6 which is connected to the base 1e of the housing of the sensor 1, as can be seen in FIG. 1b.

In the preferred embodiment shown, the second wheel 5 is in fact in the form of a sector of a circular toothed wheel, having a toothed zone 7 at its periphery. This toothed zone 7 has two teeth 9 and 10, which are so profiled as to match the profile of the periphery of the pin 4, so as to provide a mechanical coupling between the movement of the first wheel 2 and the responsive movement of the second wheel 5, by means of the pin 4 cooperating with the teeth 9 and 10. It should be noted in particular that the displacement of the second wheel or sector 5 is indicated in FIG. 1b by the arrow 5a, which is its movement in response to movement of the wheel 2 when the pin 4 is displaced in the direction of the arrow 4a. Similarly, FIG. 1b indicates by the arrow 5b the direction of movement of the sector 5 if the pin 4 is displaced in the direction of the arrow 4b.

A carriage 15b, which is movable in a retaining member 15a in straight line translational movement, is coupled to the toothed wheel or sector 5 through a linkage 20 of the crank and connecting rod type. In this linkage, a pivot pin 13, carried by the sector 5 and disposed at a radius x from its axis of rotation 6, engages in an opening 14, in the form of a slot that is formed in the linkage 20. This crank and connecting rod type linkage, comprising the pivot pin 13 and the toothed sector 5, causes the carriage 15b to move in straight line motion. The extent of this straight line movement of the carriage 15b is a measure of the direction and the number of rotations performed by the first wheel 2.

In addition, the recess 8 defined in the peripheral zone 7 of the second wheel or sector 5 is so designed as to give the indication of the neutral or reference position of the sensor. This position is indicated by the line 6a in FIG. 1b. In this neutral position (and it will be realised that in FIG. 1b the sensor is in fact shown in this position), the pin 4 lies in the recess 8 so as to fit snugly in the latter. The recess 8 is of course defined between the two teeth 9 and 10, which therefore retain the pin 4 between them when the sensor is in the neutral position. The position of the carriage 15b in the retaining member 15a is then detected in order to give a signal indicating that the steering mechanism is in the neutral position.

Reference is now made to FIGS. 2a to 2g, showing various different angular positions of the sensor 1. In FIGS. 2a to 2g, the various elements described above with reference to FIGS. 1a and 1b are not all identified with reference numerals, in order not to over-complicate the Figures.

Figure 2B:
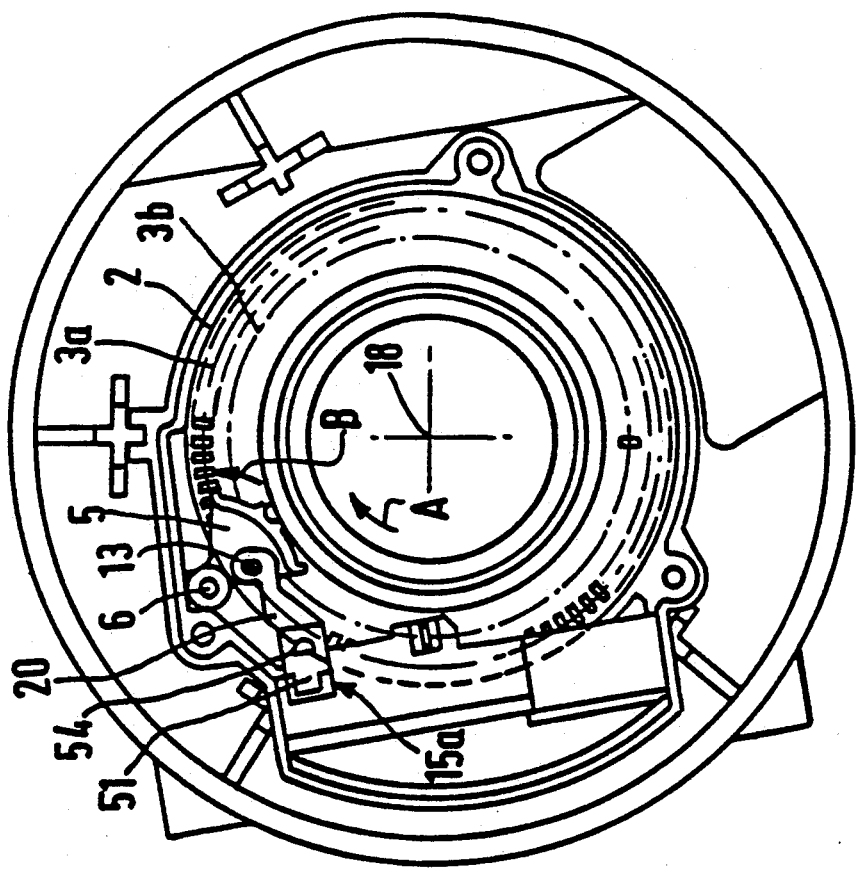
FIGS. 2a to 2g are views, again in elevation, showing the sensor of FIG. 1b in various angular positions, i.e. various positions representing different angles of rotation.
Figure 2A:
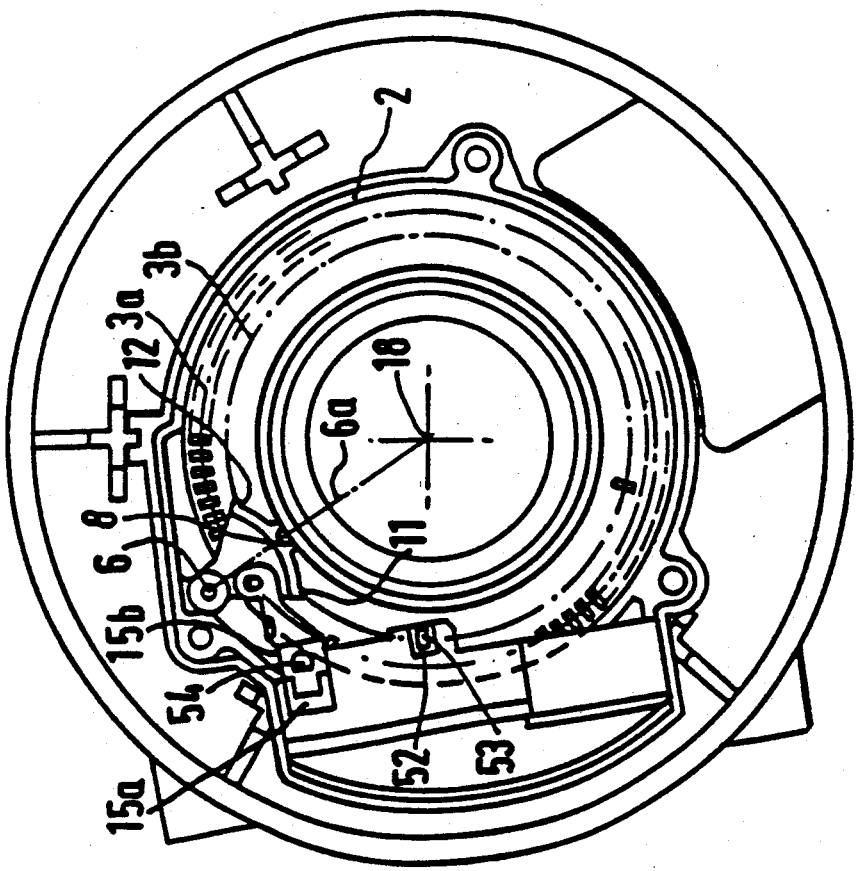

FIG. 2a corresponds to the neutral position which has already been seen in FIG. 1b, in which the line 6a which joins the axis of rotation 18 of the steering column to the centre of rotation 6 of the second wheel or sector 5 passes through the centre of the recess 8 and the pin 4, with the latter being fully received in the recess 8.

In FIG. 2b, the pin 4 is leaving the neutral position. The first wheel 2 is rotating in the direction of the arrow A, so that the sector 5 is rotating in the direction of the arrow B. The lever of the linkage 20 which couples the pivot pin 13 to the carriage 15b moves the latter in straight line motion with respect to the retaining member 15a. When the first wheel 2 has carried out nearly one full rotation about the axis 18 in the clockwise direction, the pin 4 reaches the position shown in FIG. 2c. If rotation is then continued, the end of the tooth 10 is in contact with the periphery of the pin 4, as can be seen in FIG. 2f. The carriage 15b is then subjected to a further displacement. The supplementary movement of the carriage, still in the same direction of longitudinal movement in the retaining member 15a, thus enables the completion of one rotation of the disc or first wheel 2 to be indicated.

It is possible to multiply the number of teeth 9, 10, and consequently the number of recesses defined between them, in such a way as to provide a pulse to detect each displacement of the carriage 15b in the retaining member 15a, thus enabling the number of rotations carried out to be counted. In particular, this data is particularly necessary in the case where the sensor is part of a power steering system, in order to establish at what distance change of direction of the steering wheels should be terminated during a power assisted steering maneuver. This data is also necessary in the case where the rear wheels are used as steering wheels.

In addition, the carriage 15b cooperates with a suitable conversion means, for converting the direction of rotation, and/or the completion of at least one full turn in the rotation of the first wheel 2, into a measurement signal, for example an electrical or optical signal.

Such a conversion means, for enabling the completion of at least one full turn of the wheel 2 to be monitored, is seen in the drawings. It comprises the carriage 15b and a pair of diodes indicated in the various parts of FIG. 2 at 51. These comprise an emitting diode and a receiving diode, for processing a signal indicating the position of the carriage 15b. This signal indicates the completion of one full turn in rotation of the wheel 2. In this particular embodiment, detection of the direction of rotation is carried out by a detector which detects the slots or marks 3 (FIG. 1a). These marks are in fact arranged in this example in two sets (i.e. on two tracks) 3a and 3b, with a large number of marks in the set 3a and only a single mark in the set 3b. The set of marks 3a is arranged on a common pitch circle near the periphery of the wheel 2, and the set 3b on a pitch circle which is coaxial with, and of smaller radius than, the pitch circle on which the set 3a is arranged. This can be seen best in FIG. 1b and in the various parts of FIG. 2. The slot or mark of the set 3b consists of a single slot 53 (FIGS. 2a and 2b to 2g). The slot 53 indicates the mechanical "zero" position, or neutral position, of the steering system.

In the neutral position seen in FIG. 2a, with the pin 4 on the wheel 2 lying in the recess 8 of the second wheel or sector 5, an optical detector 51 is aligned with the slot 53. An electrical reference signal is then produced. In this configuration, the carriage 15b is in a position such that it covers an aperture 54 formed in the retaining member 15a. The optical detector 51 is coupled with the carriage 15b, and receives no light from a diode (not shown) which illuminates the aperture 54. Hence there is then no signal.

It will be noted that detection of the direction of rotation and the number of rotations effected is achieved by means of two detectors arranged in quadrature, this arrangement not being shown in the drawings.

When the wheel 2 is set in rotation, the pin 4 leaves its neutral position, and as shown in FIG. 2b it moves the carriage 15b slightly in straight line movement with respect to the retaining member 15a. The wheel 2 continues rotating in the clockwise direction A, and the pin 4 pushes on the tooth 10 of the sector 5. The slot 53 thus moves away from the optical detector 52, which transmits a low level logic signal. By comparison with the signal that is generated by a further detector (not shown), which reads the marks or slots of the outer set 3a, the signal from the mark detector is the indication of the angle, and direction of rotation, of the wheel 2. By contrast, the second wheel or sector 5 has rotated in the anti-clockwise direction B, and the carriage 15b is displaced in the retaining member 15a while still covering the aperture 54. The signals emitted by the detectors 52 and 51 are thus "00".

Figure 2C:
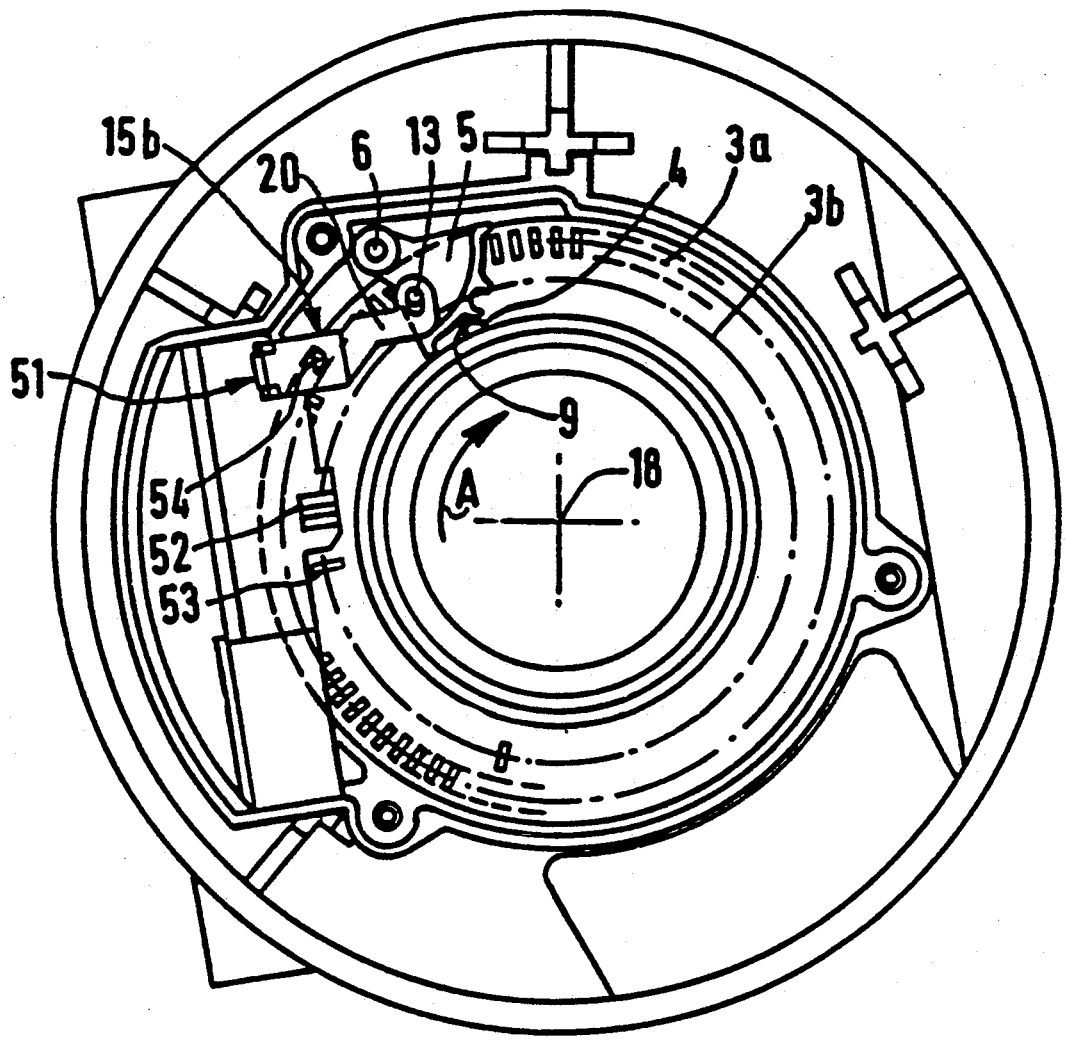
Figure 2E:
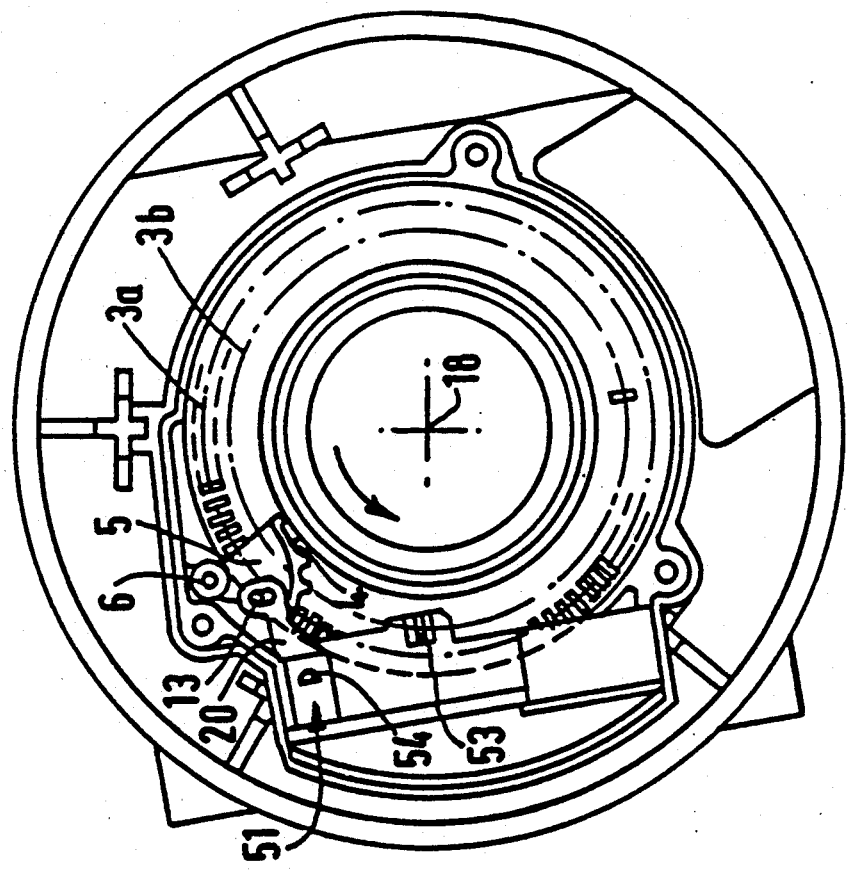
Figure 2D:
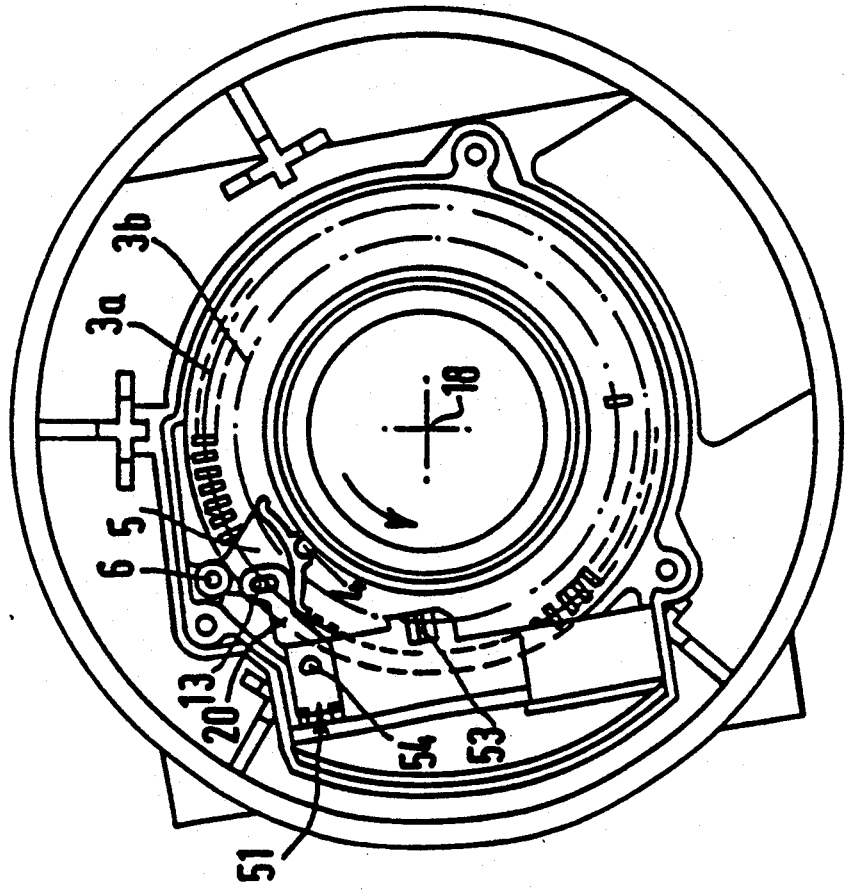
Figure 2F:
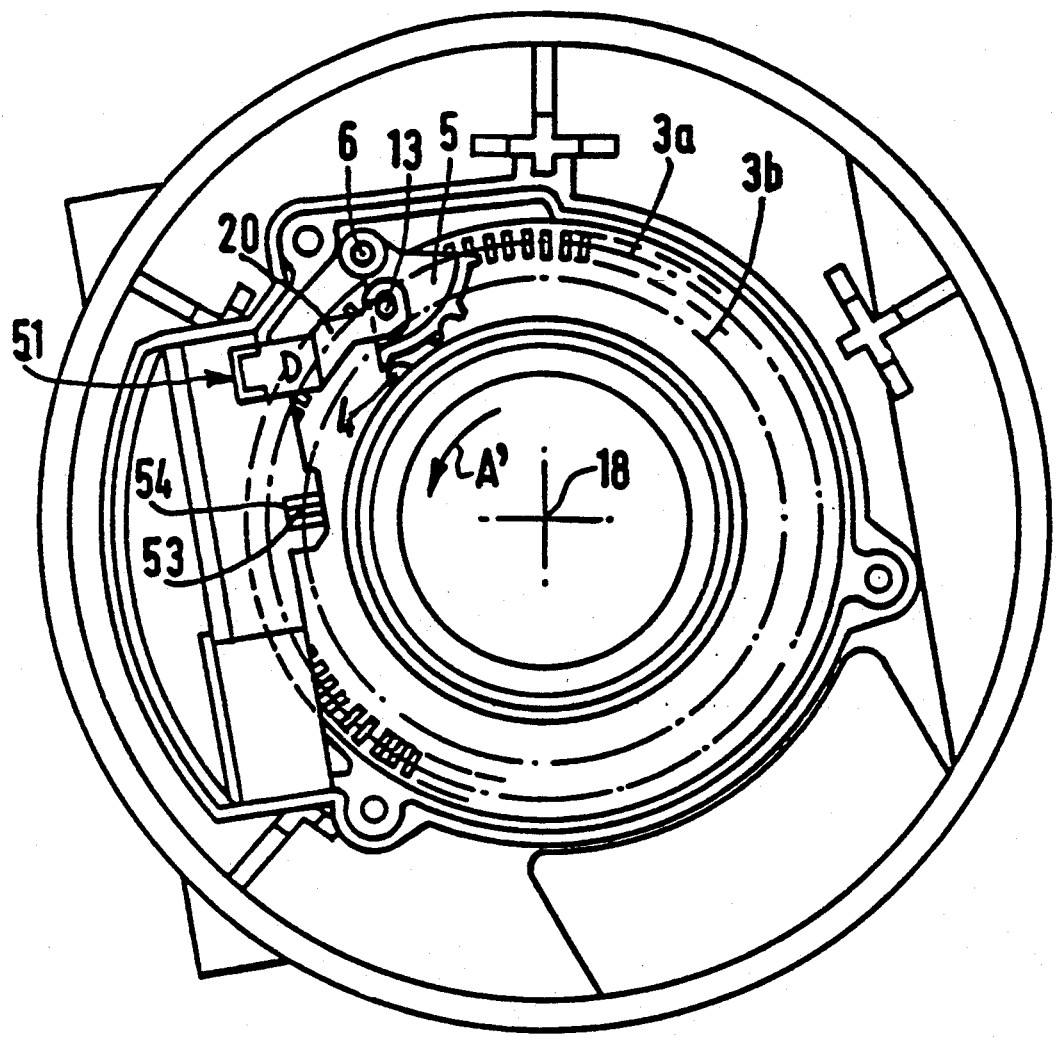
Figure 2G:
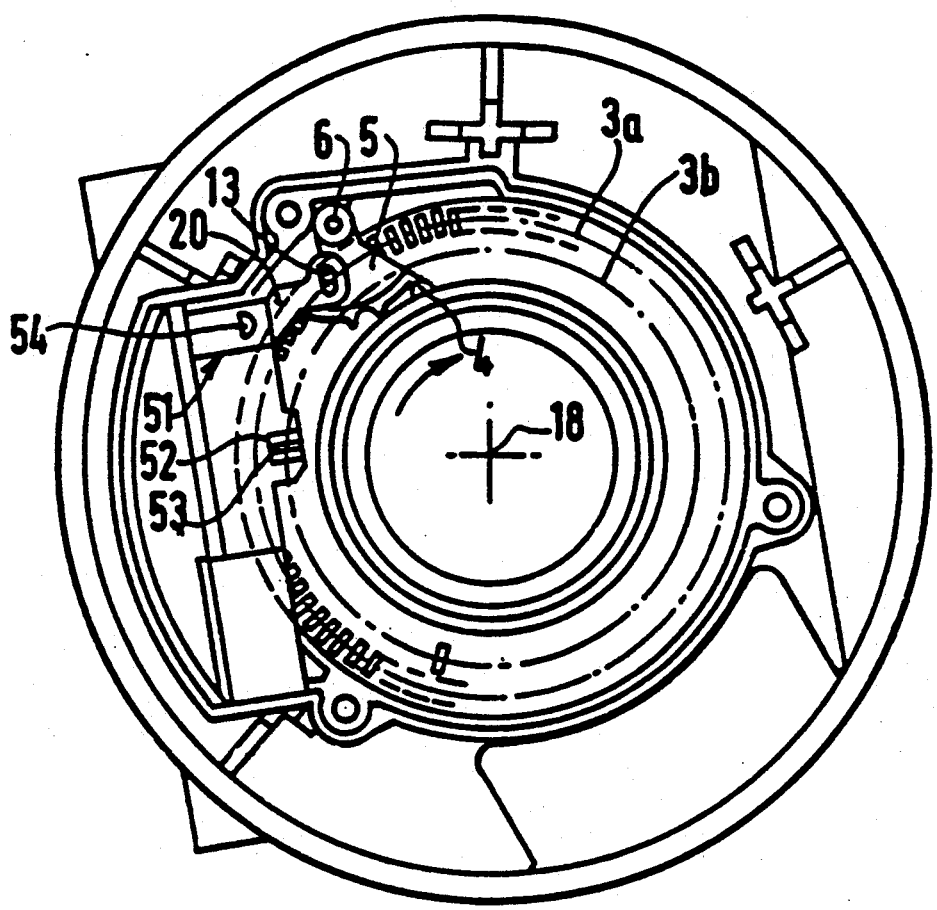

When the pin 4 reaches the position seen in FIG. 2c, it lies in contact with the tooth 9 of the sector 5. If rotation is then continued in the clockwise direction A, the pin 4 pushes on the end of the tooth 9, and the carriage 15b is thus further displaced. Accordingly, the additional movement of the carriage 15b, still in the same direction, uncovers the aperture 54, so that light passes through it between the emitting and receiving diodes 52 and the optical detector 51. This causes a new electrical signal to be emitted, which enables completion of a full turn in the rotation of the first wheel 2 to be indicated. The logic signals from the detectors is then "01".

Referring now to FIG. 2f, if the direction of rotation of the wheel 2 is now reversed to the anti-clockwise direction indicated at A', the pin 4 comes in contact with a further tooth 11 at the end of the tooth sector 5 which lies on the same side of its median line as the tooth 9 (see FIG. 1b). The pin 5 pushes on the tooth 11, so displacing the carriage 15b so that the latter once again covers the aperture 54. The system thus reverts to the configuration seen in FIG. 2b.

Where the initial rotation of the wheel 2b is anticlockwise, operation is a "mirror image" of that described above. In this case, the positions corresponding to FIGS. 2b, 2c and 2f are shown respectively in FIGS. 2d, 2e and 2g. It should be noted that the sector 5 has a further tooth 12 (FIG. 1b) at the opposite end from the tooth 11, and that in FIG. 2g the pin 4 acts on the tooth 12.

The present invention is not limited to the detection of a single complete turn in the rotation of the wheel 2. Thus it may include several pairs of optical detectors.

The detecting means seen in the various parts of FIG. 2 has been described above in an optical form. In other embodiments, it is possible to address an electronic memory by means of a switching circuit, with the memory containing addresses in the form of binary words, for example of 8 bits, representing a code which indicates the direction of rotation and/or the number of rotations carried out, in the form of electrically conductive paths, with the action of the carriage connecting these paths together electrically.

It will also be noted that, in accordance with the invention, the set of marks 3a on the first wheel 2 can be read by a conventional optical detector which is not shown. This detector processes the signal representing the instantaneous angle of rotation to at least one turn (360 degrees of rotation). The output signal may be used by a suitable electronic processing circuit, in particular one which gives an exact angle, and data as to the rate of change of steering angle, by differentiating the signal from the sensor. Circuits of this kind are already known. In one embodiment, the circuit is integrated in the processing circuit for the signals from the optical detectors 51 and 52, and is mounted on a plate 30 (which can be seen in FIG. 1a), with a connector 31 enabling polarisation to be applied to the circuit (the latter not being seen in FIG. 1a), for example on two of the six wires 32 which are connected into the connector 31. The four remaining wires are available for the signals coming from the three optical detectors constituting the sensor itself.

The angular sensor is preferably part of a power steering system for the vehicle. In particular, and as is well known per se, such a steering system includes a steering member, a detector for the force exerted by the driver, and a coupling means coupling the steering member firstly with the steerable road wheels at the front and/or the rear of the vehicle, and secondly to a source of mechanical energy which is controlled in accordance with the steering characteristics of the steerable road wheels and in response to the output signals from the detector which senses the force exerted by the driver. The steering member of course includes a steering wheel operated by the driver and mounted at one end of the steering column. The detection of the force exerted by the driver may be effected by any one of a large number of measuring means.

However, the present inventor has discovered that this measurement is in a very large number of cases adequately obtained by simple measurement of the instantaneous angle of rotation of the steering column, provided that at any given instant, the neutral position, the direction of rotation and the number of rotations performed are all known.

Thus, this sensor is especially well adapted to overcome the problem discussed above when the first wheel 2 of the sensor is coupled in rotation to the steering column, so that it can detect the forces exerted by the driver for the purpose of controlling a servo motor.

What is claimed is:

1. A sensor for sensing an angle and direction of rotation of a rotatable member comprising:
 a first wheel coupled to said rotatable member for moving with said rotatable member such that movement of said first wheel is a measure of the angle and direction of rotation of the rotatable member;
 a second wheel movable relative to the first wheel; and
 a coupling member for selectively coupling the second wheel to the first wheel such that when said first wheel is rotated in a direction, the coupling member selectively engages the second wheel for moving said second wheel in a direction opposite to that of the first wheel, said second wheel's rotation through selective points being representative of predetermined positions and direction of rotation of said rotatable member.

2. A sensor according to claim 1, wherein said coupling member between the first and second wheels comprises a pin carried by the first wheel and fixed in a rotating point thereon, and wherein said second wheel includes a first recess for meshing with said pin in a first angular position representing a neutral or reference position of the sensor.

3. A sensor according to claim 2, wherein the second wheel includes two first teeth defining the recess between them, the recess having a profile complementary to the external profile of the pin.

4. A sensor according to claim 3, wherein the second wheel is in the form of a sector which further includes at least one further tooth arranged on at least one side of said first teeth, with an end of each said further tooth defining between it and the adjacent first tooth a second recess for engagement by said pin for the purpose of indicating the completion of at least one first rotation of the first wheel.

5. A sensor according to claim 1, further comprising a carriage, means mounting the carriage for linear displacement therein, means coupling the second wheel with the carriage, and conversion means for converting the quantity detected by said detector into a measurement signal.

6. A sensor according to claim 5, wherein the means coupling the carriage with the second wheel is an articulated means of the crank and connecting rod type.

7. A sensor according to claim 1, wherein the first wheel carries at least one track comprising indicia representing position information, the sensor further including: a detector responsive to said track for giving a signal representing the absolute value of angle of rotation in respect to said information; a housing containing said first and second wheels and detector; an electronic circuit within the housing for processing the signals from the detector and having output means; a connector carried by the housing and connected to said output means of the electronic circuit; and means in the housing enabling the connector to be accessible from outside.

8. A sensor according to claim 7 further including means connecting said detector to said connector for processing said signal and passing it to said connector.

9. A sensor according to claim 8, wherein the first wheel has two said tracks, comprising a first track representing the neutral position of the system and comprising a single indicia mark, and a second track, the sensor further including a first detector for reading the first track and a second detector for reading the second track, whereby the advance or retard of the phase of the reading signal supplied by the first detector, in quadrature with the reading signal from the second detector, indicates the direction of rotation.

10. A power steering system comprising a sensor according to claim 1 and a steering member coupled mechanically with the first wheel of the sensor.

11. A sensor for sensing an angle of rotation of a rotatable member, comprising a first wheel for moving with said rotatable member whereby movement of the first wheel is a measure of the angle of rotation of said rotatable member and of the direction and origin of such rotation, the sensor further including a second wheel, a coupling pin carried by the first wheel and fixed in a rotating point thereon for coupling the first and second wheels so that at least part of the movement of the first wheel causes movement of the second wheel relative to the first wheel in response thereto, said second wheel having first and second teeth defining a recess having a profile complementary to the external profile of said pin for meshing with said pin in a first angular position representing a neutral or reference position of the sensor, said second wheel being in the form of a sector and including a third tooth spaced apart from said first tooth and defining between said first and third teeth a second recess for engagement by said pin for indicating the completion of at least one first rotation of the first wheel and at least one detector for detecting the displacement of the second wheel.

12. A sensor for sensing an angle of rotation of a rotatable member, comprising a first wheel for moving with said rotatable member whereby movement of the first wheel is a measure of the angle of rotation of said rotatable member and of the direction and origin of such rotation, the sensor further including a second wheel, a coupling member for coupling the first and second wheels so that at least part of the movement of the first wheel causes movement of the second wheel relative to the first wheel in response thereto; at least one detector for detecting the displacement of the second wheel in such a way as to indicate at least one of the quantities selected from the direction of rotation of the first wheel and the number of rotations effected by the first wheel; a carriage; means mounting the carriage for linear displacement therein; means coupling the second wheel with the carriage; and conversion means for converting the quantity detected by said detector into a measurement signal.

13. A sensor according to claim 12 wherein the means coupling the carriage with the second wheel is an articulated means of the crank and connecting rod type.

* * * * *